US012529520B2

(12) United States Patent
Mozzi et al.

(10) Patent No.: US 12,529,520 B2
(45) Date of Patent: Jan. 20, 2026

(54) APPARATUS FOR HEATING STEEL PRODUCTS

(71) Applicants: Danieli & C. Officine Meccaniche S.p.A., Buttrio (IT); Danieli Centro Combustion S.p.A., Cinisello Balsamo (IT)

(72) Inventors: Enrico Mozzi, Genoa (IT); Corrado Ferrari, Genoa (IT); Andrea Biliotti, Genoa (IT)

(73) Assignees: DANIELI & C. OFFICINE MECCANICHE S.P.A., Buttrio (IT); DANIELI CENTRO COMBUSTION S.P.A., Cinisello Balsamo (IT)

( * ) Notice: Subject to any disclaimer, the term of this patent is extended or adjusted under 35 U.S.C. 154(b) by 616 days.

(21) Appl. No.: 18/008,074

(22) PCT Filed: Jun. 4, 2021

(86) PCT No.: PCT/IT2021/050172

§ 371 (c)(1),
(2) Date: Dec. 2, 2022

(87) PCT Pub. No.: WO2021/245716

PCT Pub. Date: Dec. 9, 2021

(65) Prior Publication Data

US 2023/0304740 A1 Sep. 28, 2023

(30) Foreign Application Priority Data

Jun. 4, 2020 (IT) ........................ 102020000013285

(51) Int. Cl.
*F27B 9/10* (2006.01)
*F27B 9/20* (2006.01)
(Continued)

(52) U.S. Cl.
CPC .................. *F27B 9/10* (2013.01); *F27B 9/36* (2013.01); *F27D 7/06* (2013.01); *F27D 99/0033* (2013.01);
(Continued)

(58) Field of Classification Search
CPC ...... F27B 9/10; F27B 9/36; F27B 9/20; F27D 7/06; F27D 99/0033; F27D 99/0073;
(Continued)

(56) References Cited

U.S. PATENT DOCUMENTS 3,892,391 A 7/1975 Okuno
4,054,411 A 10/1977 Beck
(Continued)

FOREIGN PATENT DOCUMENTS

CN 106288794 A * 1/2017 ............... F27D 3/00
EP 2230453 A2 9/2010
(Continued)

OTHER PUBLICATIONS

DOE_oxygen_enriched_combustion_2005.pdf (Year: 2005).*
(Continued)

*Primary Examiner* — Steven S Anderson, II
*Assistant Examiner* — Kurt J Wolford
(74) *Attorney, Agent, or Firm* — Panitch Schwarze Belisario & Nadel LLP

(57) ABSTRACT

An apparatus for the thermal heating of steel products that includes inside it a path for feeding the steel items which extends between an entry end and an exit end of the steel items, a mechanism for feeding a fuel, and a mechanism for feeding a comburent including oxygen, and burners able to operate the combustion of the fuel and of the comburent.

15 Claims, 8 Drawing Sheets

(51) Int. Cl.

| | |
|---|---|
| ***F27B 9/36*** | (2006.01) |
| ***F27D 3/00*** | (2006.01) |
| ***F27D 7/06*** | (2006.01) |
| ***F27D 99/00*** | (2010.01) |

(52) U.S. Cl.
CPC ..... *F27D 99/0073* (2013.01); *F27D 99/0075* (2013.01); *F27B 9/20* (2013.01); *F27D 2003/0034* (2013.01); *F27D 2099/0078* (2013.01)

(58) Field of Classification Search
CPC ......... F27D 99/0075; F27D 2003/0034; F27D 2099/0078; F27D 1/0026; F27D 2001/0053; F27D 2001/0073; F27D 2001/0079; F27D 1/02; F27D 2099/0093; F27D 2099/0095
See application file for complete search history.

(56) References Cited

U.S. PATENT DOCUMENTS

| | | | | | |
|---|---|---|---|---|---|
| 4,249,888 | A * | 2/1981 | Werych | F27D 1/14 | 432/252 |
| 5,564,178 | A * | 10/1996 | Takashima | B21B 1/466 | 29/33 C |
| 6,183,246 | B1 * | 2/2001 | Le Gouefflec | C21D 9/0006 | 432/12 |
| 2006/0246391 | A1 * | 11/2006 | Gaur | F27D 7/06 | 432/121 |
| 2010/0273121 | A1 * | 10/2010 | Gleason | F27D 7/04 | 432/48 |
| 2015/0168067 | A1 | 6/2015 | Eichler | | |

FOREIGN PATENT DOCUMENTS

| | | | | |
|---|---|---|---|---|
| EP | 2796570 | A1 | 10/2014 | |
| EP | 2824216 | A1 | 1/2015 | |
| EP | 2891859 | A1 | 7/2015 | |
| KR | 20120063859 | A * | 6/2012 | F27D 25/008 |
| KR | 20140066581 | A * | 6/2014 | F27B 14/10 |

OTHER PUBLICATIONS

CN-106288794-A translation (Year: 2025).*
KR-20120063859-A translation (Year: 2025).*
KR-20140066581-A translation (Year: 2025).*

* cited by examiner

APPARATUS FOR HEATING STEEL PRODUCTS

CROSS-REFERENCE TO RELATED APPLICATIONS

This application is a Section 371 of International Application No PCT/IT2021/050172, filed Jun. 4, 2021, which was published in the English language on Dec. 9, 2021, under International Publication No. WO 2021/245716 A1, which claims priority under 35 U.S.C. § 119 (b) to Italian Application No. 102020000013285, filed Jun. 4, 2020, the disclosures of each of which are incorporated herein by reference.

FIELD OF THE INVENTION

The present invention concerns a method and an apparatus for the production of steel products, in particular to carry out a heat treatment for heating steel products, in general but not only semi-finished products.

The steel products to which the invention refers can be both flat products and long products.

By long products we generally mean billets or blooms intended for the production of steel bars, rods, profiles and tubes.

By steel products we mean metal or non-metal products, for example alloys. The invention allows to minimize, if not eliminate, the content of scale present on the products at exit from the furnace, in a substantially “scale free” condition.

BACKGROUND OF THE INVENTION

Rolling plants used in the steel industry are traditionally associated with heating furnaces the role of which is to raise the temperature of the semi-finished products, for example arriving from continuous casting, up to a predefined value suitable for plastic deformation, to be sent for example to rolling. The semi-finished products can be flat products, such as slabs, or long products, such as billets or blooms for example.

To make the steel products reach temperatures suitable for plastic deformation quickly, different heating methods can be applied based on as many different physical principles. Among these, the most common are convection, irradiation and induction.

Convection is a heat exchange phenomenon in which the heat flow is exchanged by means of a heating fluid that laps the product. The heat flow is directly proportional to the temperature difference, or temperature delta, between the heating mean and the surface of the steel product.

On the contrary, irradiation provides that the heat flow is exchanged not by contact but by irradiation between a hot surface and the surface of the steel product to be heated. The heat flow is directly proportional to a temperature delta between the radiating surface (hot) and the surface of the metal product, but in this delta both the temperatures are raised to the fourth power, according to the Stefan-Boltzman law.

Induction consists in the generation of currents inside the product itself, induced by a magnetic field in which it is immersed. These internal currents promote the heating of the product.

Due to productivity requirements, the heat exchange phenomena and the electrical powers involved, irradiation is the physical principle most used in the industrial field.

Heating by irradiation is obtained thanks to surfaces that are kept very hot by means of electric resistances, or by flames that burn a fuel in the presence of a comburent. The products of combustion, which are usually CO, $CO_2$, $H_2$, $H_2O$, $O_2$ and possible impurities present in the fuel itself, have such a high enthalpy content as to constitute an “irradiating” mean toward a cold surface.

In general, the comburent contains molecular oxygen O2. Heating apparatuses are known which, to control the heating temperatures and the combustion ratios inside the furnace, use lances to supply pure molecular oxygen, the use of which allows a better control of the quantity of oxygen actually present inside the various parts of the furnace. One disadvantage of using pure oxygen is that its extraction, storage and management entail high costs. Furthermore, it is not readily available and/or usable in all metallurgical plants.

As an alternative to oxygen, normal air can be used as a comburent, but this entails the disadvantage of a difficult precise control of the quantity of oxygen in the furnace, due to the ambient air that can penetrate inside the furnace and modify the combustion parameters.

Returning to the principle of irradiation, there are two distinct application methods: direct combustion irradiation, in which contact between the combustion products and the surface of the products is allowed; and indirect combustion irradiation, in which contact between the combustion products and the surface of the products is instead prevented.

Among the known types of heating furnaces, the most common are those with direct and continuous combustion irradiation; in these furnaces the products are made to pass inside an almost perfectly closed environment in order to allow continuous heating of the products.

This type of furnace is widespread because it allows to achieve the best productivity, compared to other types of furnaces, and allows massive production.

Typically, a heating furnace comprises, in succession, in the direction of feed of the semi-finished products, an initial pre-heating zone, an intermediate heating zone and a temperature maintenance zone.

The pre-heating zone can be extended over about half the length between the entry point and the exit point from the furnace. The temperature inside the furnace, generally above 700° C., increases between the entry and exit of the furnace.

FIG. 1 shows a graph of an example of the progress of the temperature of a billet in a furnace. In the example shown, the furnace has a length of 20 meters. Curve T1 indicates the temperature set inside the furnace, while curves T2, T3 and T4 represent, respectively, the internal temperature of a billet, taken at a point close to the core (axis), the external temperature of the billet, taken at a point near the upper or lower surface, and the average temperature of the billet. Curve D represents the temperature difference between the outside and the core of the billet.

As can be seen, the temperature of the furnace starts from just over 700° C. at the entry to the furnace and gradually increases up to about halfway through the furnace. From there to the exit zone (on the right on the graph), the temperature remains high but at a substantially constant value, with minimal variation. Meanwhile, the temperature difference between the core and the outside of the billet progressively decreases, until it reaches a value of practically zero (curve D).

One disadvantage of known thermal heating furnaces lies in the formation, on the surface of the products, of a surface layer of undesired material commonly called scale, or calamine.

The scale consists of iron oxides of varying chemical composition, typically comprising FeO, $Fe_3O_4$ and $Fe_2O_3$. Their formation derives from the contact of the surfaces of the products with the combustion products of a fuel.

Scale is formed in particular due to the time the steel billets or blooms remain in an oxidizing and high temperature environment. In fact, it has been verified that its formation increases exponentially with the time the billets remain in these conditions.

The formation of a surface layer of scale is problematic as it constitutes a source of surface defects that are rolled, as well as a not negligible economic loss.

To prevent surface defects from occurring in the metal product, it is generally provided to remove the layer of scale using water descalers, which work at high pressure, or brushing systems. The removed scale ends up among the waste products, which leads to a loss of material which in turn implies a reduction in the weight of the semi-finished products, to the disadvantage of the yield of an operation to transform or process steel.

There is therefore a need to perfect a method to heat semi-finished metal products, and a corresponding apparatus, which can overcome at least one of the disadvantages of the state of the art.

In particular, one purpose of the present invention is to perfect a method to heat iron and steel products, for example but not only steel, which allows to drastically reduce the formation of scale on the surface of steel products, reducing it by at least 50% and even to negligible values ("scale free").

Another purpose of the present invention is to perfect a heating method which allows to obtain a massive production of steel products.

Another purpose is to provide an apparatus which allows to carry out the method as above.

Yet another purpose is to provide an apparatus which allows to use air as a comburent and at the same time allows precise control of the quantity of comburent air—and therefore of the oxygen involved in the combustion—present inside the furnace.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a method and an apparatus for the thermal heating of steel products, for example semi-finished, metal and non-metal products, are described below.

In accordance with some embodiments, the thermal heating method provides to control/regulate the internal atmosphere of the furnace in order to reduce the quantity of oxygen present in the various zones of the furnace.

The method also provides, advantageously, to feed at least one steel product, for example a semi-finished product, through a thermal heating apparatus, and to control/regulate, during the heating ramp up of the products to be heated, the level of oxygen in the atmosphere inside the apparatus. Preferably, the steel product is fed along a feed path that extends between an entry end and an exit end.

Advantageously, the method provides, at least during the heating ramp up of the pieces to be heated, to feed a fuel and a comburent comprising oxygen into the apparatus, and to carry out the combustion of the fuel and of the comburent by means of a plurality of burners disposed inside the apparatus.

According to some embodiments, in at least one zone of the apparatus, the comburent is fed in such a way that the oxygen is in stoichiometric or sub-stoichiometric proportion with respect to the fuel.

By sub-stoichiometric quantity of oxygen, we mean a quantity lower than that strictly necessary to obtain complete combustion. In this way, the presence of residual oxygen during the combustion in correspondence with the above-mentioned zone of the inside of the apparatus is limited, or even eliminated.

Preferably, inside the apparatus there are defined at least a first part and a second part, in succession along the direction of feed of the products, wherein the temperature of the second part is higher than the temperature of the first part. It is advantageous, according to the invention, that the feed of the comburent with a stoichiometric or sub-stoichiometric quantity of oxygen occurs in correspondence with the second part.

Preferably, the method also provides to monitor the quantity of oxygen present inside the apparatus.

In accordance with some embodiments, the method provides to carry out, in the first part of the apparatus, the combustion of the residues of fuels not consumed in the second part.

Advantageously, the steel products fed into the apparatus have a lateral size variable from 100 to 250 mm. More advantageously, the lateral size is greater than 190 mm. The products as above preferably have a round or square section.

According to one aspect of the invention, the apparatus for the thermal heating of steel products comprises a furnace inside which there is defined a path for feeding products that extends between an entry end and an exit end of the furnace.

The furnace comprises an entry aperture to allow the steel products to be heated to enter the furnace, and an exit aperture to allow them to exit from the furnace, and means for feeding a fuel.

The entry and exit apertures are disposed in correspondence with the respective entry and exit ends.

The furnace also comprises means for feeding a comburent comprising oxygen, such as normal air, and burners able to actuate the combustion reaction of the fuel and of the comburent. Advantageously, the means for feeding comburent and the means for feeding fuel are configured to feed the comburent and the fuel so that the oxygen is in a sub-stoichiometric or stoichiometric proportion with respect to the fuel at least in one part of the apparatus.

The oxygen in the comburent can be in a proportion equal to about 2-3%, as normally present in air, or even in a greater proportion, obtained by means of oxygen $O_2$ enrichment techniques.

The exit aperture is favorably provided with a sealing device comprising at least one packing configured to interact with a door that closes the exit aperture and inert gas barrier means configured to prevent the entry of air into the furnace.

In accordance with some embodiments, the inert gas barrier means comprise at least one chamber delimited in the edge of the exit aperture and at least one aperture to feed the inert gas toward the exit aperture. For this purpose, the aperture of the chamber is oriented toward the exit aperture of the furnace.

Preferentially, the sealing device also comprises water sealing means disposed around the exit aperture, more preferentially around the inert gas barrier means.

Preferentially, the furnace is divided internally into a first part and a second part disposed in succession along the path for feeding the steel products. More preferentially, the means for feeding comburent and the means for feeding fuel are configured to feed the comburent and the fuel so that the oxygen is in sub-stoichiometric or stoichiometric proportion with respect to the fuel in correspondence with the second part.

According to some embodiments, the first part and the second part are in turn divided into two zones.

In particular, the first part comprises an entry zone, or charging zone, which extends from the entry end, and a pre-heating zone that extends from the end of the entry zone to the beginning of the second part. The second part, in turn, is divided into a heating zone, consecutive to the pre-heating zone, and an equalization zone, which extends between the heating zone and the exit end.

According to some embodiments, the heating apparatus also comprises a post-combustion device configured to inject comburent into the heating apparatus, preferably in the first part of the furnace, where the temperature is lower. Therefore, the post-combustion device allows to complete the combustion chemical reaction (not completed in the equalization end zone) by injecting comburent (in order to burn unburnt fuel mixed with the residues of incomplete combustion coming from said zone) and to transfer the residues from combustion (now complete) to the first part of the apparatus.

Preferentially, the post-combustion device comprises one or more nozzles disposed in the first part of the furnace and configured to inject comburent into it.

According to some embodiments, the apparatus comprises a station for unloading the heated products disposed outside the furnace in correspondence with the exit end and configured to unload the heated products out of the furnace.

Advantageously, the unloading station comprises one or more conveyor devices partly inserted inside the furnace in order to convey the heated products through the exit door. These conveyor devices are commanded by mechanical elements located outside the furnace. For this reason, therefore, the conveyor devices are each provided with a respective sealing device, comprising water sealing means and inert gas barrier means, and placed in correspondence with an aperture made through an end wall of the furnace.

Preferably, the water sealing means are inserted inside the through aperture and are configured to close it hermetically, and the inert gas barrier means are disposed immediately outside the through aperture and are advantageously disposed coaxial to the water sealing means.

According to some embodiments, the unloading station also comprises one or more transfer devices equipped with respective transfer members partly inserted inside the furnace and configured to transfer the heated products from the feed plane to the conveyor devices. These transfer members are also equipped with mechanical command elements located outside the furnace.

Advantageously, the transfer devices each comprise at least one transfer member located mobile inside a containing box and partly inserted inside the furnace; the containing box is advantageously directly connected to the furnace and filled with water and an inert gas in order to prevent the entry of air into the furnace, and is in air communication with the inside of the furnace to allow the transfer member to enter inside it.

According to some variants, the furnace comprises an upper wall, also called the upper vault, formed by a plurality of modules connected to each other by means of plates connected to two consecutive modules by means of tie-rods, and comprises an internal closing member in each hollow space present between two consecutive modules, in order to hermetically close the hollow spaces.

Advantageously, the upper vault also comprises a plurality of strip-shaped packings each interposed between an internal closing member and one or more corresponding plates.

In accordance with some embodiments, the furnace comprises, in correspondence with a lower wall thereof, also called the bottom, one or more evacuation hoppers, the upper end of which is inside the furnace. The hoppers are provided to collect the scale potentially present as this detaches from the steel product located in transit on the conveyor elements in order to exit the furnace. Therefore, in order to prevent air from entering from these hoppers, they too are equipped with a sealing device able to prevent the entry of air into the furnace.

In particular, each hopper comprises a lower duct at the end of which there is connected a plate and a respective sealing element comprising a packing and a closing element attached to the external surface of the lower duct and which covers the packing.

Preferably, each hopper comprises an internal member attached to the external surface of the lower duct inside the closing element and configured to press the packing against the closing element.

The combination of the sealing elements described above, and the corresponding constructive and functional measures, allows to seal the inside of the furnace from the outside, ensuring that the entry or exit of unwanted air are reduced to a minimum, and therefore allowing to obtain the control of the oxygen present with the maximum precision and the precise stoichiometric ratios provided. This reduces to a minimum, almost completely eliminating, the formation of scales on the surface of the metal products.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more non-limiting examples are shown in the attached drawings. The phraseology and terminology used here is also for the purposes of providing non-limiting examples.

Figure 2:
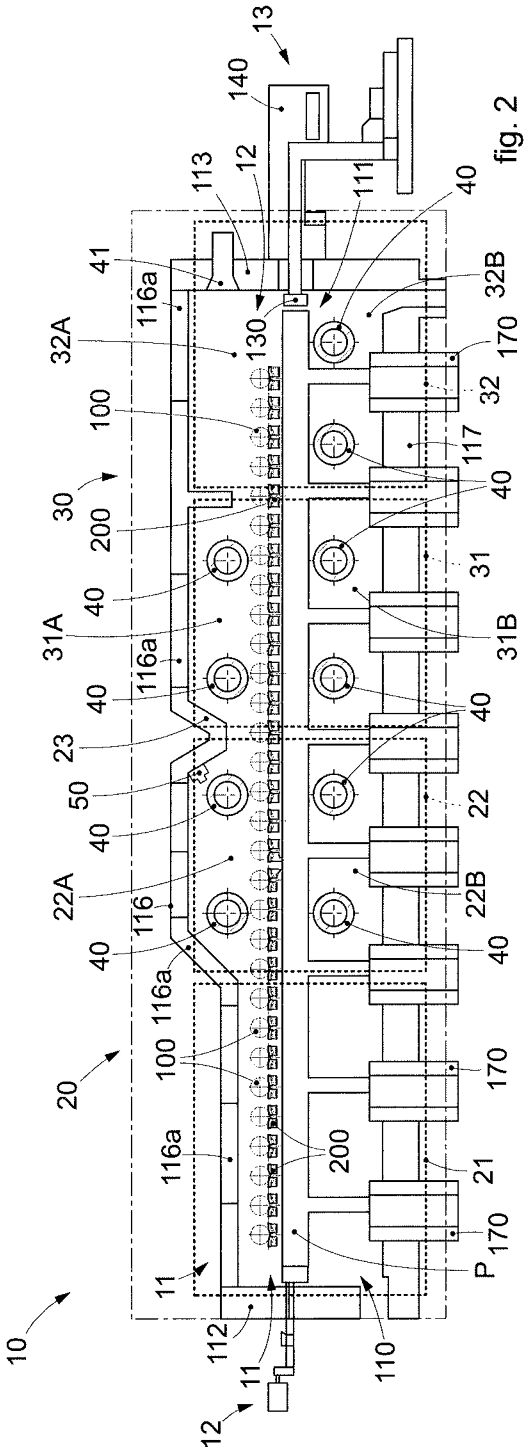
FIG. 2 is a longitudinal section of an apparatus for heating steel products according to the invention, taken along plane II-II of FIG. 3.
Figure 3:
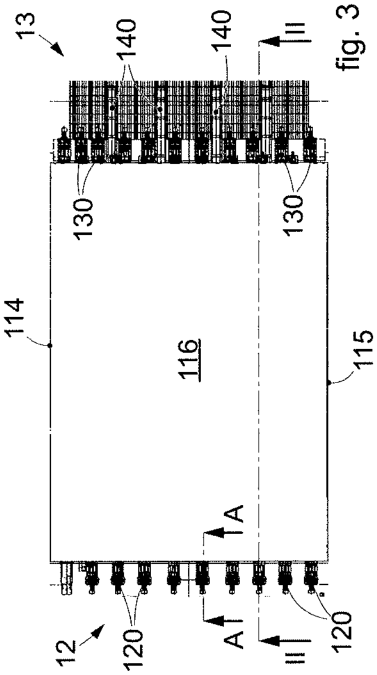
FIG. 3 is a plan view of the apparatus of FIG. 2.

FIGS. 2 and 3 show an apparatus 10 for heating steel products 100 of the casting semi-products type, typically steel billets.

Hereafter, for simplicity, we will refer to billets 100, or blooms, as products treated in the apparatus 10, but this reference is made only by way of example The apparatus 10 comprises a furnace 11, preferably of the direct combustion irradiation type and with continuous feed. The furnace 11 has an entry end 110 and an exit end 111 opposite the entry end 110, in correspondence of which there are located respectively a loading station 12, or charging station, and an unloading station 13, or discharging station, configured respectively to load the billets 100 into the furnace 11 in correspondence with the entry end 110 and to unload the heated billets 100 from the furnace 11 in correspondence with the exit end 111.

Inside the furnace 11 there is defined a straight path for feeding the billets 100, extending between the entry end 110 and the exit end 111, through which the billets respectively enter and exit the furnace 11.

The entry 110 and exit 111 ends are defined by respective end walls 112, 113 of the furnace 11, which also has two lateral walls 114, 115 each connected to the two end walls 112, 113, as well as an upper wall 116, also called vault, and a lower wall 117, also called bottom. These walls 112-117 contribute to delimit an internal volume of the furnace in which the heating of the billets 100 is operated, and in which the path for feeding the billets 100 is located.

The feed path is defined on a horizontal plane P, located at an intermediate height inside the furnace 11 (FIG. 2) between the upper wall 116 and the lower wall 117, preferably at about half the height of the furnace 11.

The billets 100 are disposed in special receivers 200, commonly referred to as seatings, which are displaced in an advantageously continuous manner between the entry end 110 and the exit end 111.

Advantageously, the furnace 11 comprises an entry aperture disposed in correspondence with the entry end 110, more preferably in correspondence with a lateral wall 114, 115 of the furnace 11.

The furnace 11 is divided internally into a first part 20 and a second part 30, which are disposed in this order along the feed path. The first part 20 starts from the entry end 110 and is set at a first temperature T1 for the pre-heating of the billets 100, in order to raise their temperature gradually. For this reason, the first part 20 of the furnace 11 is also called the pre-heating zone. For example, the temperature T1 in the first part 20 ranges between approximately 700 and 1000-1100° C., depending on the steel to be heated.

Figure 1:
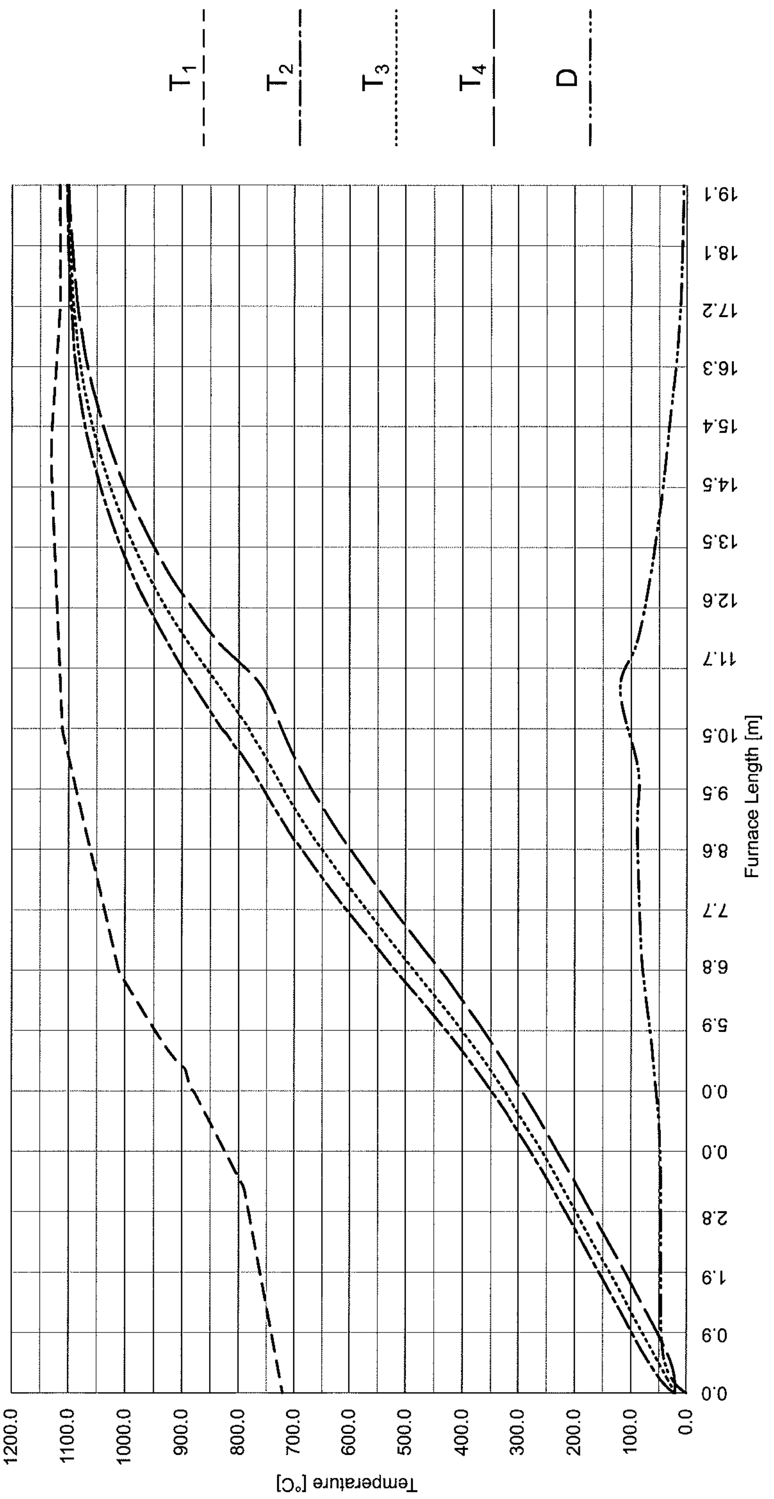
FIG. 1 is a possible temperature graph of a billet inside a 20 m long furnace.

The second part 30 is located between the first part 20 and the exit end 111, and is set at a second temperature T2 higher than the first temperature T1 (FIG. 1). The temperatures T2, typically higher than 1000° C., are such as to heat the billets 100 to the point of making them plastically deformable.

As can be seen from FIG. 2, the first part 20 delimits an entry zone 21, or charging zone, adjacent to the entry end 110 of the furnace 10. The entry zone 21 is followed by a pre-heating zone 22, also included in the first part 20 of the furnace 11.

Preferably, the second part 30 is also separated into two zones, a heating zone 31, which directly follows the pre-heating zone 22, and an equalization zone 32 located between the heating zone 31 and the exit end 13 of the furnace 11.

Figure 4:
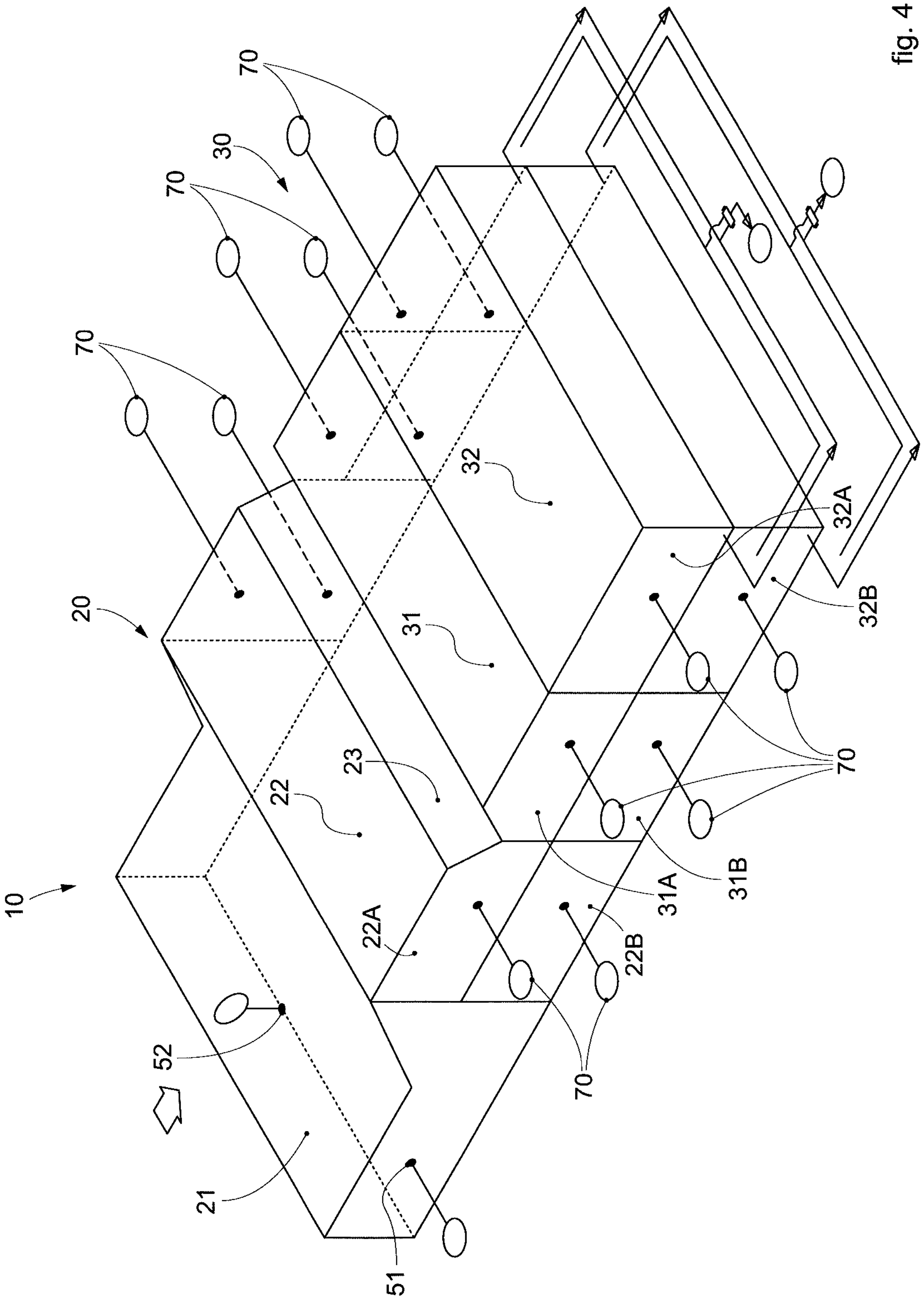
FIG. 4 is a partial perspective schematic view of the apparatus of FIG. 2.

In the example shown in FIGS. 2 and 4, the heating zone 31 is divided into an upper heating half-zone 31A and a lower heating half-zone 31B, located below the upper heating half-zone 31A.

Similarly, the equalization zone 32 is divided approximately in half into an upper equalization half-zone 32A and a lower equalization half-zone 32B.

This division of the heating zone 31 and of the equalization zone 32 is preferably materialized by the plane P for feeding the billets 100. It follows that the pre-heating zone 22 is also divided into an upper pre-heating half-zone 22A and a lower pre-heating half-zone 22B (FIGS. 2 and 3).

The heating zone 31 is set at a temperature T2 higher than the maximum temperature T1 of the pre-heating zone 22, and has the purpose of heating the billet 100 until it is deformable, for the subsequent rolling. The equalization zone 32, with a temperature T2 even higher than the heating zone 31, has the purpose of levelling out the temperature of the steel between the inside of the billet and its surface.

The temperature inside the furnace 11 is gradually and continuously increased along the rectilinear feed path, starting for example from 700° C. in correspondence with the entry end 110 to reach temperatures of the order of 1000° C. at the end of the first part 20. In the second part 30, the temperature T2 is substantially maintained at the same high value, or slightly higher than the temperature obtained at the end of the pre-heating zone 22, so as to increase the temperature of the billet, both on its surface and also in its interior. For example, the temperature T2 in the second part can be of the order of 1100° C.

It should be noted that the temperatures inside the furnace 11 are regulated so as not to overheat the surface of the billets, to the detriment of skin-heart homogeneity.

The zones 21, 22, 31, 32 defined above advantageously have well-known sizes and volumes, which allows to effectively control their physical parameters during the functioning of the thermal heating apparatus 10, in particular the temperature and the concentrations of fuel and of comburent present inside them.

In the example shown, the first part 20 and the second part 30 have substantially equal lengths. The entry zone 21 has a height preferably lower than the height of the other zones 22, 31, 32, all three of which have the same height.

Advantageously, the limit between the first part 20 and the second part 30 is materialized by an internal edge 23 which protrudes from the upper wall of the furnace 11. This upper internal edge 23 can have a height such that its lower end is at the same height of the upper wall in the entry zone 21.

The apparatus 10 also comprises, inside it, combustion members 40, or burners, distributed between the different zones 21, 22, 31, 32 previously defined. The burners 40 are connected to a source of fuel, for example methane, and a source of comburent which preferably contains oxygen, in particular air, by means of suitable means for feeding fuel and means for feeding comburent, for example pipes.

In the example shown in FIG. 2, the apparatus comprises several burners 40, referred to as lateral, disposed in the lateral walls 114, 115 of the furnace 11, and at least one burner 41, referred to as frontal, disposed in correspondence with the exit end 111. More advantageously, the furnace 11 comprises a plurality of front burners 41, for example eight, regularly distributed between the lateral walls 114, 115 so as to uniformly heat the upper equalization half-zone 32A.

It should be noted that the burners 40 are disposed in the pre-heating zone 22, in the heating zone 31 and in the equalization zone 32. By way of example only, it can be provided that on each of the lateral walls 114, 115 of the furnace there are four burners 40 in the pre-heating zone 22 and in the heating zone 31, and only two burners 40 in the equalization zone 32.

In the latter zone 32, the lateral burners 40 are preferably disposed only in the lower equalization half-zone 32B, due to the presence of the front burners 41 in the upper equalization half-zone 32A.

The burners 40, 41 used in the furnace 11 are advantageously able to operate in any condition whatsoever of comburent quantity with respect to fuel quantity.

In particular, there is defined a ratio LAMBDA=$A_{real}/A_{theoretical}$, in which $A_{real}$ is the quantity of comburent actually delivered, and $A_{theoretical}$ is the quantity of comburent to which there corresponds the precise quantity of oxygen necessary and sufficient to complete the combustion reactions involved, which are:

$$C+O_2=CO_2+33910\ kj/kg$$

$$2H_2+O_2=2H_2O+143000\ kj/kg$$

$$S+O_2=SO_2+8800\ kj/kg$$

If LAMBDA is equal to 1, the combustion is carried out with the precise theoretical quantity of oxygen. The burners 40 are able to operate both with LAMBDA less than 1, and also with LAMBDA greater than 1.

The apparatus 10 also comprises means for feeding fuel, to feed the fuel from the corresponding source to the burners 40, 41, and means for feeding comburent, to feed the comburent from the corresponding source to the burners 40, 41.

Preferably, the means for feeding comburent and the means for feeding fuel are configured to feed the fuel in excess with respect to the comburent in correspondence with the second part 30. In this way, a complete consumption of the comburent, and therefore of the oxygen, is promoted during combustion which allows to heat and maintain the temperature of the billets, preventing the formation of scale on the steel products ("scale free" products).

In the present invention, the scale is reduced by at least 50% with respect to known solutions, even down to negligible values.

For example, it can be provided that the means for feeding comburent and the means for feeding fuel are configured to feed the excess fuel so as to have a sub-stoichiometric proportion of oxygen in the equalization zone 32, and to have a sub-stoichiometric or stoichiometric presence of oxygen in the heating zone 31.

By stoichiometric proportion we mean, in the context of this description, that the quantity of oxygen introduced is exactly equal to that suitable for burning the exact quantity of fuel introduced (this corresponds to LAMBDA=1).

Similarly, by sub-stoichiometric proportion we mean that the quantity of oxygen introduced is smaller than the quantity necessary to burn the quantity of fuel introduced (this corresponds to LAMBDA<1). In other words, when the air is fed in a sub-stoichiometric proportion, the combustion reaction theoretically leads to the complete consumption of oxygen while the fuel is not totally consumed.

On the contrary, the means for feeding fuel and comburent are preferably configured so as to feed the excess comburent (LAMBDA>1) into the first part 20 of the furnace 11.

It is also advantageous to provide that the apparatus 10 is equipped with an additional comburent injection circuit, also called post-combustion system, configured to complete the combustion of the fuel transferred (without being combusted) from the second part 30 of the furnace 11 (where the comburent is fed in sub-stoichiometric proportion) to the first part 20 (where the comburent is fed in excess). In this way, the excess fuel in the second part 30 is burned in the first part 20 and the combustion reaction is used to transfer heat to the steel semi-products.

This provision allows to optimize fuel consumption. The post-combustion circuit comprises nozzles 50 located in the first part 20 of the furnace 11, obviously inside the latter. According to some embodiments, the circuit also comprises a control device configured to check that the fuel has been consumed.

Advantageously, it can be provided to dispose the nozzles 50 on the upper internal edge 23, more advantageously on the surface of the upper internal edge 23 facing toward the first part 20 of the furnace 11, so as to directly inject the comburent into it, while avoiding injecting it into the second part 30 of the furnace (FIG. 2).

In the example shown, the post-combustion circuit is capable of operating the consumption of excess fuel in the upper half-zone 22A of the pre-heating zone 22. In order to further optimize fuel consumption, other nozzles 50 can be provided (not shown) disposed in the lower zone of the first part 20 of the furnace, preferably in the lower half-zone 22B of the pre-heating zone 22.

For example, a second internal edge can be provided, which can be similar to the internal edge 23 of the upper wall, but disposed on the lower wall. The nozzles of the lower half-zone 22B can be advantageously disposed on this lower internal edge, and facing toward the pre-heating zone 22. The presence of the lower internal edge also allows to further determine the separation between the first part 20 of the furnace 11 and the second part 30.

Preferably, the control device is configured to measure the presence of oxygen, and possibly also of carbon monoxide CO in the entry zone 21. For this purpose, the control device can comprise a laser spectrometer 51, one or more oxygen probes 52 to detect free oxygen and one or more CO sampling probes. The spectrometer 51 and the free oxygen probe 52 are preferably disposed in the entry zone 21.

The furnace 10 also preferably comprises oxygen sensors able to monitor the presence and concentration of oxygen inside the furnace 11. Preferably, the furnace comprises at least one sensor in each of the entry 21, pre-heating 22, heating 31 and equalization 32 zones.

Advantageously, the sensors are configured to monitor the presence of oxygen continuously. More advantageously, they are of the optical type, for example of the laser type.

Preferably, the furnace 11 also comprises a fumes extraction system, configured to extract the combustion fumes from the inside of the furnace 11 toward the outside. More preferably, the fumes extraction system, which is known and therefore not described further in the present application, is located in the first part 20 of the furnace 11.

According to some embodiments, the apparatus 10 can also comprise a plurality of probes 70 connected to the furnace 11 to detect the presence and/or concentration inside it of other chemical compounds such as, for example, carbon monoxide CO, carbon dioxide $CO_2$, hydrogen $H_2$ and/or methane $CH_4$.

In the example shown, the apparatus 10 comprises four probes 70 in each of the pre-heating 22, heating 31 and equalization 32 zones of the furnace 11. Preferably, the probes 70 are disposed in the lateral walls 114, 115 of the furnace 11 (FIGS. 2 and 4). More preferably, they are disposed in pairs, the two components of one same pair each being placed in one respective lateral wall 114, 115 and facing each other.

Even more preferably, the two pairs of each of the pre-heating 21, heating 31 and equalization 32 zones are disposed one above the other, that is, vertically aligned. For example, in the heating 31 and equalization 32 zones, it can be provided to have one pair of probes 70 in the upper half-zone 31A, 32A, and the other in the lower half-zone 31B, 32B.

The furnace 10 also preferentially comprises thermometers disposed in the different zones of the furnace so as to detect the temperature in correspondence therewith.

According to some embodiments, the furnace 11 also provides laser sensors disposed so as to be able to check the straightness of the billets 100 and their state of advance inside the furnace.

It should be noted that all the sensors as above are advantageously connected to the furnace without providing holes in its walls, or providing an appropriate sealing thereof, in order to limit the risks of air entering inside it as much as possible.

Advantageously, the apparatus 10 also comprises a series of measures aimed at improving the gas seal, in order to prevent the loss of fuel and/or comburent, but also and above all the entry of unwanted air into the furnace. In this way, it is possible to regulate the composition of the atmosphere inside the different zones 21, 22, 31, 32 of the furnace 11 with greater precision. These measures are substantially present in all the zones of the furnace 11 that separate the internal volume of the furnace 11 from the outside, with particular regard to the hottest part of the furnace, that is, the second part 30. For example, the furnace 11 can comprise doors with improved seal.

Figure 2A:
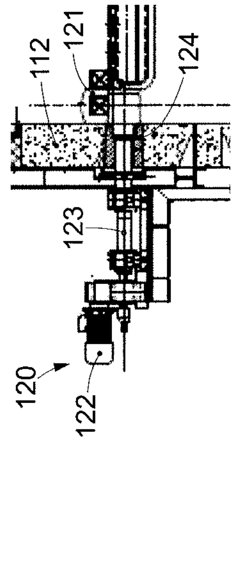
FIG. 2*a* is a longitudinal section of a detail of the apparatus of FIG. 2, taken along plane A-A of FIG. 3.

In the example shown in FIGS. 2 and 3, the loading station 12 is located outside the entry end wall 112. The loading station 12 in turn comprises a plurality of conveyor devices 120 each comprising a roller 121 located inside the furnace 11, and a corresponding motor member 122 located outside the furnace. The roller 121 and the motor member 122 are coupled by means of a shaft 123 which passes through a corresponding through aperture 124 made in the end wall 112 of the furnace 11 (FIG. 2*a*).

Similarly, the unloading station 13 is located outside the exit end wall 113 and comprises conveyor devices 130, provided to convey the billets 100 out of the furnace 11, and transfer devices 140 to transfer the billets 100 from the feed plane P to the conveyor devices 130.

Figure 5:
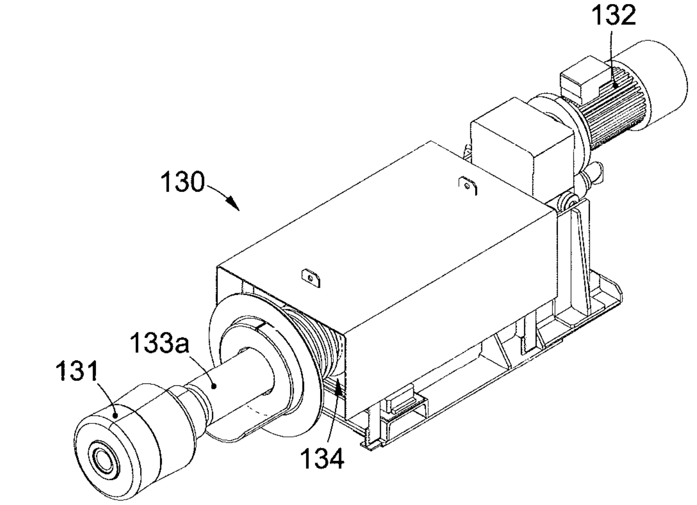
FIG. 5 is a three-dimensional view of a conveyor device of the unloading zone.
Figure 6:
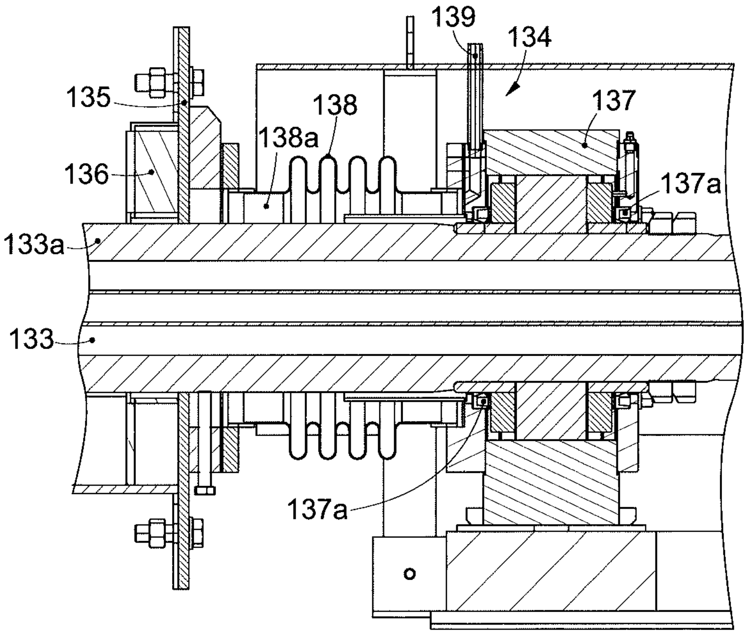
FIG. 6 is a longitudinal section of a part of the conveyor device of FIG. 5.

The conveyor devices 130 (FIGS. 5 and 6) are similar to the conveyor devices 120 of the loading station 12, and comprise a roller 131 placed during use inside the furnace 11, and a motor member 132 to drive it, the roller 131 and the motor member 132 being reciprocally coupled by means of a shaft 133 rotatably inserted inside a fixed sleeve 133*a*. The sleeve 133*a* is made to pass through a through aperture made in the exit end wall 113, so that the motor member 132 remains outside the furnace 11.

Each conveyor device 130 of the unloading station 13 is provided with a sealing device 134 disposed around the sleeve 133*a* and placed during use outside the furnace. The sealing device 134 comprises an attachment collar 135 attached around the sleeve 133*a* and configured to be attached in the through aperture of the exit end wall 113 of the furnace 11 so as to close it hermetically. The attachment collar 135 provides an internal chamber 136 in which water is present as an insulating substance. It should be noted that the internal chamber 136 has a diameter smaller than the diameter of the attachment collar 135, and is configured to be inserted inside the through aperture of the exit end wall 113.

The conveyor device 130 also comprises a support ring 137 placed between the attachment ring 135 and the motor member 132, and provided with a pair of packings 137*a*, for example of the type made of rubber or suchlike. Between the attachment ring 135 and the support ring 137 there is provided a bellows sleeve 138 around the sleeve 133*a* and distanced from it so as to form a cylindrical chamber 138*a*. The cylindrical chamber 138*a*, hermetically closed both on the side of the attachment ring 135 and also on the side of the support ring 137, is connected to a feed aperture 139 through which an inert gas is fed, for example nitrogen or argon. The cylindrical chamber 138*a*, which extends up to the attachment ring 135, allows to improve the air tightness in correspondence with the attachment ring 135, making up for any losses of seal at the joint between the attachment ring 135 and the sleeve 133*a*.

In the example shown, the conveyor devices 120 of the loading zone are not provided with the same sealing device described above, but it is obviously possible that they can be, to the advantage of an optimized control of the quantity of air also inside the first part 20 of the furnace 11.

Figure 7:
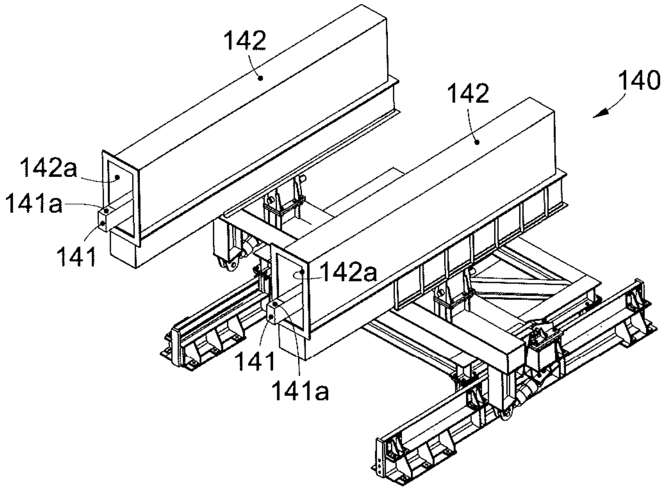
FIG. 7 is a three-dimensional view of a transfer device of the unloading zone.
Figure 8:
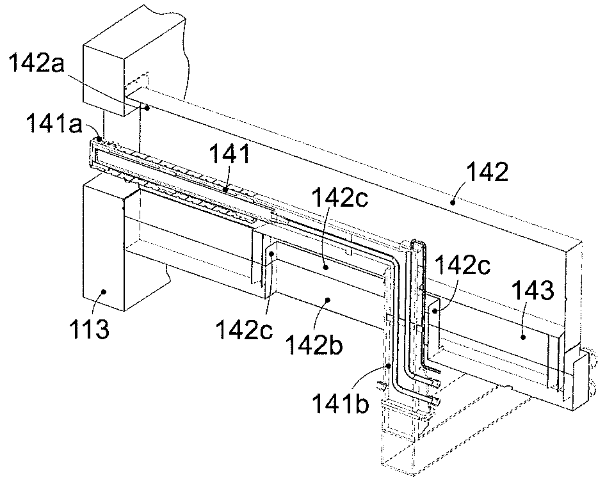
FIGS. 8 and 9 are three-dimensional views and sections of a detail of the transfer device of FIG. 7, in two different operating steps.
Figure 9:
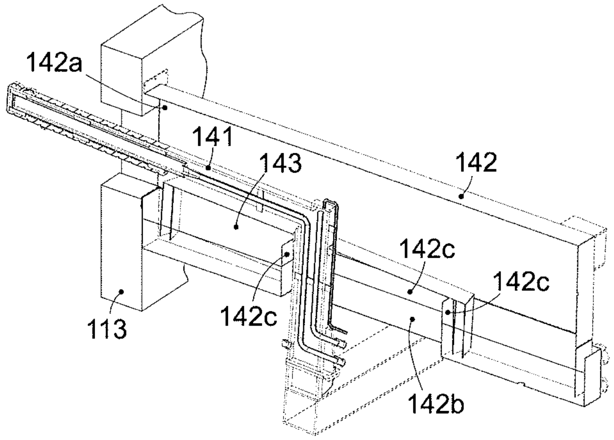

The unloading station 13 also comprises a pair of transfer devices 140 (FIG. 7) which each comprise two transfer members 141 configured to be inserted inside the furnace 11 and displace the billets 100. The transfer members 141 are configured as arms provided with a corresponding seating 141*a* for a section of billet 100 (FIGS. 7 and 8), and integral with respective supports 141*b* perpendicular thereto (FIGS. 8 and 9). In particular, in an inactive position (FIG. 8), the arm 141 is oriented horizontally while the support 141*b* is oriented vertically downward.

Each transfer member 141 is enclosed in a respective hermetically closed containing box 142, comprising an end aperture 142*a* to allow the passage of the arm 141, and a lower aperture 142*b* to allow the passage of the support 141*b*. The end aperture 142*a* is intended to be attached to the exit end wall 113 of the furnace 11, which determines its hermetic closure. The lower aperture 142*b*, on the other hand, is left open, and has an elongated shape in the longitudinal direction with respect to the containing box 142 so as to allow the forward and backward displacement of the support 141*b*, and is delimited by four walls 142*c* which extend vertically inside the containing box 142 (FIGS. 8 and 9).

The transfer member 141 also comprises a clamping crankcase 143 attached to the support 141*b*, of rectangular parallelepiped shape and enclosed in the containing box 142. In particular, the clamping crankcase 143 is totally open on its lower side and is disposed around the four walls 142*c* that delimit the lower aperture 142*b* of the containing box 142.

The containing box 142 is partly filled with liquid water, at a level in any case lower than the height of the walls 142*c* that delimit the lower aperture 142*b* but high enough so that the lower edge of the clamping crankcase 143 is always immersed, regardless of its position, for example the inactive position (FIG. 8) in which the arm 141 is not raised, or a lifting position (FIG. 9) in which the arm is made to advance so that its end is inside the furnace 11 and raised. The rest of the inside of the containing box 142 is filled with an inert gas, such as nitrogen or argon.

The combination of walls 142*c*, clamping crankcase 143 and water level inside the containing box 142 allows to block the air that passes through the lower aperture 142*b* in the clamping crankcase 143. Furthermore, if some air were to pass between the lower edge of the crankcase 143 and the body of water, it would be blocked by the inert gas that fills the rest of the containing box 142.

Figure 10:
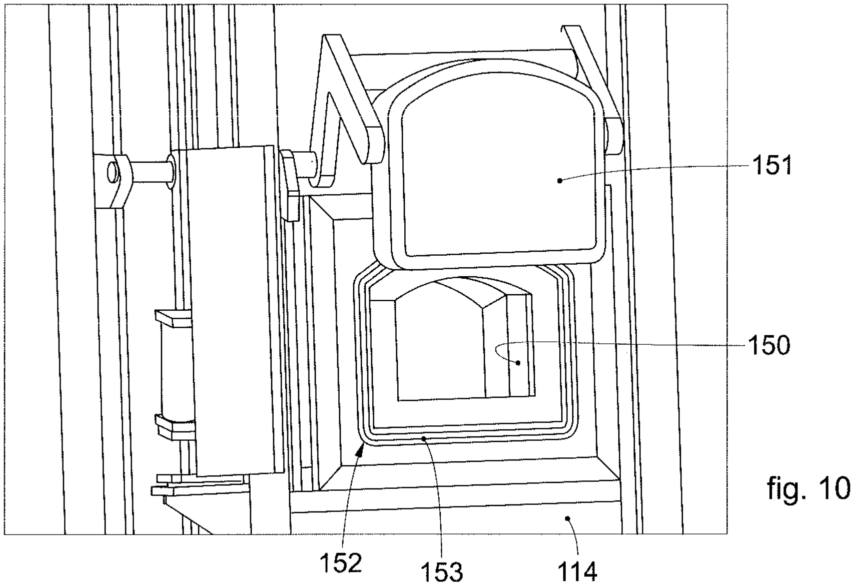
FIG. 10 is a three-dimensional view of an exit aperture of the furnace.
Figure 11:
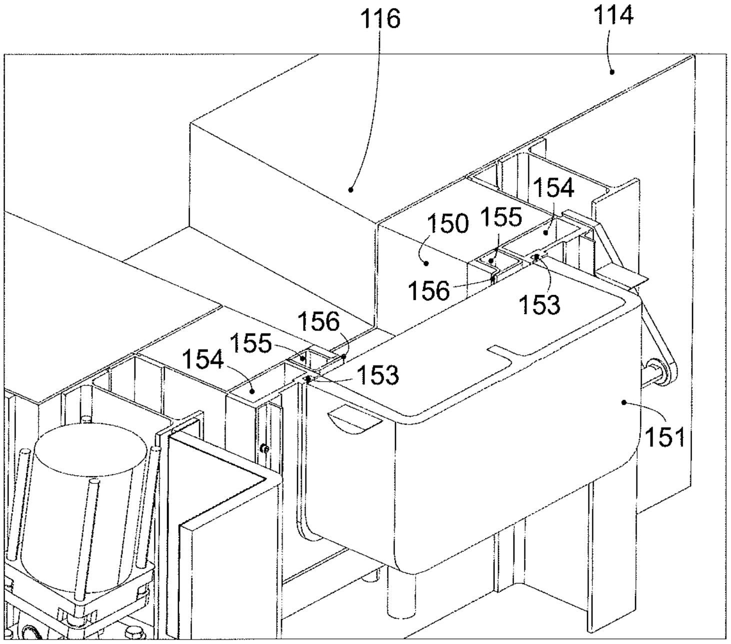
FIG. 11 is a partly sectioned and three-dimensional view of the detail of FIG. 10.

FIGS. 10 and 11 show a discharge aperture 150 of the furnace 11, through which the heated billets 100 are discharged. The discharge aperture 150 is advantageously provided at the end of the lateral wall 114 of the furnace 11, in the proximity of the exit end 113.

The discharge aperture 150 is provided with a closing door 151 which can be driven between a closing position, in which it is in contact with the discharge aperture 150 so as to close it hermetically (FIG. 11), and an opening position in which it is distanced from the discharge aperture 150 (FIG. 10). The discharge aperture 150 is suitably surrounded by a sealing device 152 which comprises a packing 153 in correspondence with the external surface of the discharge aperture 150, so as to come into contact with the closing door 151 when it is in the closing position. In this way, a first seal is operated in order to prevent the passage of air.

The sealing device 152 also comprises a first internal chamber 154 located behind the packing and extending outside it with respect to the discharge aperture 150. The first internal chamber 154 is filled with water as a sealing liquid. There is also provided a pair of lateral chambers 155, located directly on the sides of the discharge aperture 150, between the latter and the first internal chamber 154 (FIG. 11). These lateral chambers 155 are provided to be filled with an inert gas, such as nitrogen or argon, and each comprise a respective vertical linear aperture 156 oriented toward the discharge aperture 150 so as to blow the inert gas toward the discharge aperture 150, thus creating an inert gas barrier to prevent the entry of air when the closing door 151 is in the opening position. The chambers 155 therefore act as barrier means.

Figure 12:
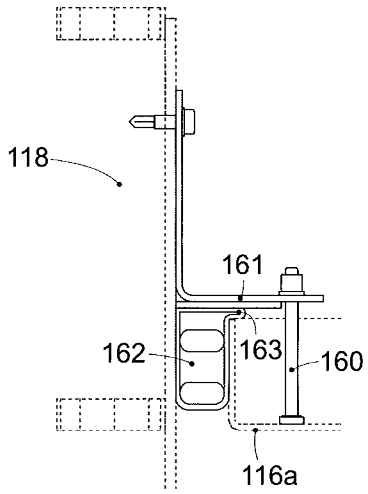
FIGS. 12 and 13 are lateral views of two details of a support zone of the furnace.

In a preferred solution, another element that improves the hermeticism of the furnace 11 is made in the upper wall 116, which consists of a plurality of modules 116*a* oriented transversely with respect to the furnace 11 and assembled in succession by means of tie-rods 160 connected to each other by means of connection plates 161. FIG. 12 shows a detail of the assembly of a module 116*a* to a lateral and longitudinal beam 118 of the upper wall 116. The plate used is bent into an I, shape so as to be attached both to the beam 118, in correspondence with a lateral surface thereof, and also to a module 116*a*, by means of a tie-rod 160, in correspondence with its upper surface.

In order to hermetically close this zone, in which apertures are created between the edge of the module and the plate 161, for example, it is provided to insert an internal closing member 162 provided with a lip 163 that protrudes perpendicularly and is configured to be housed in a sealed manner in the space between the edge of the module 116*a* and the plate 161. In addition to the internal closing member 162, there is also provided a packing 164 with a flat shape, advantageously made of fiber.

Figure 13:
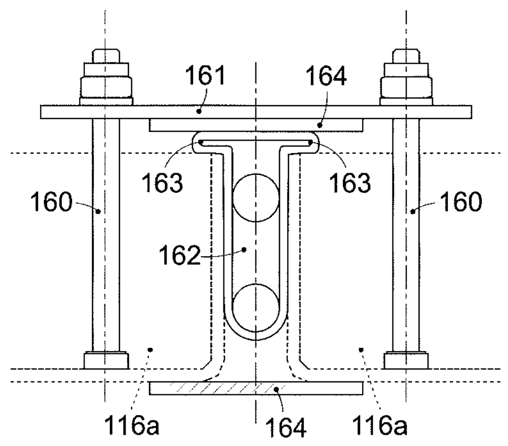

Similarly, in correspondence with the transverse joints between two consecutive modules 116*a* (FIG. 13), it is provided to insert, between the two modules, a T-shaped internal closing member 162, that is, provided with two lateral lips 163, and two packings 164*a* made of fiber, one attached to the lower surfaces of the two consecutive modules 116*a*, the other clamped between the internal closing member 162 and the plate 161 located above the space between the two modules 116*a*. This plate 160 is centered with respect to the space so as to partly cover both modules 116*a*, so that it can be attached to both of them by means of respective tie-rods 160 (FIG. 13).

It should be noted that the upper wall 116 is provided with two lateral packings 164 and as many internal closing members 162 which each extend along a respective lateral beam 118, and with a plurality of transverse packings 164 and as many lateral closing members 162 located in correspondence with the joints between two consecutive modules 116*a*. In this way, all the apertures between the modules and the lateral beams are closed.

Finally, in order to improve the seal in correspondence with the lower wall 117, sealing members have been inserted in hoppers 170 that collect the scale, which constitute the main access point for air in this zone of the furnace 11.

Figure 14:
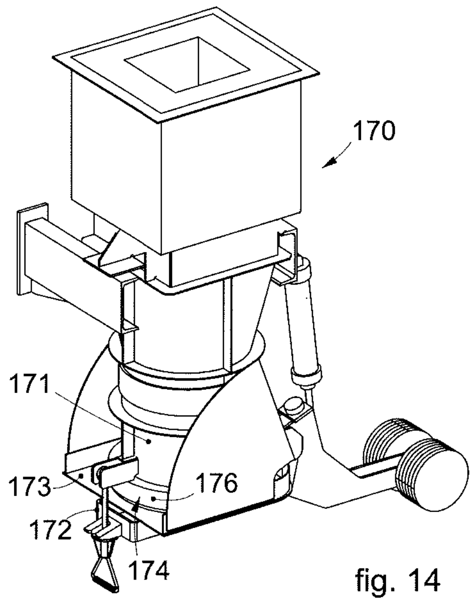
FIG. 14 is a three-dimensional view of an evacuation hopper of the apparatus.
Figure 15:
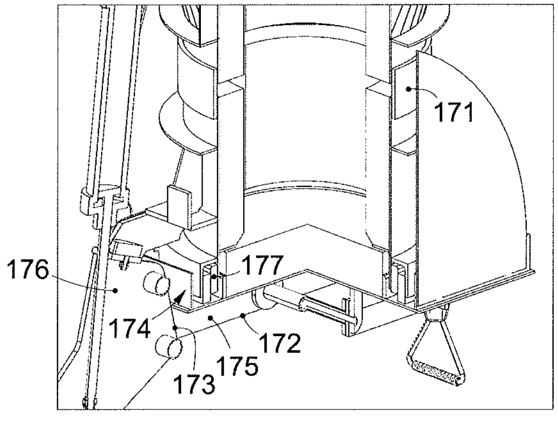
FIG. 15 is a partly sectioned enlarged view of a detail of the evacuation hopper of FIG. 14.

Such hoppers 170 comprise a lower duct 171 with a substantially cylindrical shape that can be selectively closed by a closing element 172 which is mobile between a position in which the lower duct 171 is open and a position in which the lower duct 171 is closed (FIGS. 14 and 15).

Each hopper 170 comprises a plate 173 attached to the lower aperture of the lower duct 171, and a sealing element 174 that covers the joint between the lower duct 171 and the plate 173 in order to prevent the passage of air in this zone. In particular, the sealing element 174 comprises an annular packing 175 with a rectangular section, which rests on the plate 172, and a closing ring 176 attached outside the lower duct 171 in correspondence with its lower edge (FIG. 15). This closing ring 176 has an inverted L-shape, its vertical part being located outside the packing with respect to the lower duct 171. The closing ring 176 is also provided with an internal member 177 attached to the external wall of the lower duct 171 and extending horizontally so as to press against the internal surface of the annular packing 175, in order to guarantee the seal between the closing ring 176 and the packing 173.

The combination of elements described above allows to control the quantity of air inside the furnace 11 with almost absolute precision, because the unwanted and uncontrolled entry of air from the outside of the furnace is prevented. Such control of the air allows to guarantee the functionality of the process and to almost totally prevent the formation of scale on the billets 100, thanks to the precise control of the quantity of air inside the furnace. It is therefore possible to feed normal air into the furnace so that the oxygen is in a sub-stoichiometric quantity in the second part of the furnace 11 without risking an unwanted additional entry of air.

There is therefore the convenience of using air as a comburent and at the same time achieving precision in controlling the quantity of oxygen present inside the furnace 11.

In order to manage all its components, the furnace 10 comprises a centralized management system (not shown in the drawings) which receives the results of the parameters detected by means of the sensors and probes, and allows to regulate the flows of fuel and of comburent that are fed into the furnace 10.

A functioning mode of the heating apparatus 10 described above is as follows.

The billets 100 are fed continuously along the rectilinear feed path inside the furnace 10 previously taken to functioning condition, that is, with the different zones set at working temperature. The temperature setting is carried out based on the composition of the steel of the billets 100, as well as on their sizes, and is regulated so as not to overheat the surface of the billets.

In order to operate the heating inside the furnace 11, it is provided to feed the fuel and the comburent, in a controlled manner, toward the burners 40 which operate the combustion, thus generating the desired heat.

Advantageously, in the second part 30 of the furnace, in which the temperature T2 is higher than in the first part 20, the comburent and the fuel are fed so that the oxygen is in stoichiometric and/or sub-stoichiometric proportion with respect to the fuel. In this way, all the oxygen is consumed during combustion. In the absence of oxygen in the second part 30 of the furnace 10, the formation of scale on the surface of the billets is prevented (which can be called "scale free"), reducing it by at least 50% down to negligible values.

It is possible to provide to regulate the feed of the comburent in a differentiated manner in the zones of the furnace 10, for example so that the oxygen is in a sub-stoichiometric proportion in the equalization zone, and in a sub-stoichiometric or stoichiometric proportion in the heating zone.

The feed of comburent in sub-stoichiometric proportion ensures that part of the fuel present in the second part 30 is not combusted. This residual part of fuel is transferred, together with the combustion fumes, toward the first part 20 of the furnace 10, where the fumes extraction system is located.

According to some embodiments, in the first part 20 of the furnace 10 the comburent and the fuel are fed so as to have an excess of oxygen. This excess of oxygen can be supplied by means of the post combustion circuit.

In fact, it is provided to inject, by means of the post combustion circuit, the necessary comburent in correspondence with the first part 20, in order to complete the combustion of the non-combusted fuel in the second part 30. In this way, the residual fuel is supplied with the comburent necessary to complete the combustion, preventing the emission of non-combusted products.

In order to ensure a correct distribution of the comburent inside the apparatus 10, the presence and concentration of oxygen is monitored continuously, by means of the laser oxygen sensors 51.

According to some embodiments, a gas and air control loop is provided inside the furnace 11, during which the feed flow rates of fuel and of comburent are controlled and regulated, for example by the centralized management system, so as to maintain the fuel/comburent ratio at the desired value in each of the entry 21, pre-heating 22, heating 31 and equalization 32 zones.

In accordance with some embodiments, there is also provided a constant control of the final quality of the heating, considering the variations in the speed of advance of the semi-finished steel products inside the furnace 11. In particular, it can be provided to constantly control the concentrations of comburent and fuel, as well as the temperature inside the different zones 21, 22, 31, 32 of the furnace 11. In the case of parameters that are not coherent with a predetermined quality level of the semi-finished steel products, it is possible to intervene by suitably varying one or more of such parameters, and/or the speed of advance of the semi-finished steel products.

The controls as above are performed by the management system of the furnace, with the aid of the control device 52.

In accordance with other embodiments, it can be provided that the management system implements a function for managing the residence time of the semi-finished steel products inside the furnace 11.

This management function can be implemented in two different modes, which are the variable residence time mode, and the constant residence time mode, which considers the idle times in the advance of semi-finished steel products 100.

The management with variable residence time provides that the furnace 11 is always fully loaded, that is, that all the seatings 200 are loaded with a corresponding semi-finished product 100 (as in FIG. 2).

When there are stops in the advance of the seatings 200, the semi-finished steel products 100 present inside the furnace 11 accumulate residence time in the furnace which will result, when discharged from the furnace, in a total residence time greater than the optimal residence time, determined by design (we mean optimal time based on design calculation).

The variable residence time mode corresponds to a management mode already known in the sector.

The constant residence time management mode is instead aimed at keeping the heating time of each semi-finished product as constant as possible, regardless of the average hourly productivity, and at the same time as close as possible to the optimal time based on design calculation.

Maintaining the heating time is preferably achieved by means of a loading pattern which can provide unloaded seatings 200, that is, without a semi-finished steel product 100.

As shown in FIGS. 16A-D, the loading pattern of the seatings 200 is modified by increasingly spacing the semi-finished products, alternating empty seatings 200 with loaded seatings 200. The loading pattern can be adapted on the basis of the characteristics of the semi-finished product 100 to be obtained.

With respect to the complete loading of the furnace 11, loading classes can be identified, which correspond to respective loading percentages of the seatings 200, according to the characteristics of the final product.

Figures 16A, 16B, 16C, 16D:
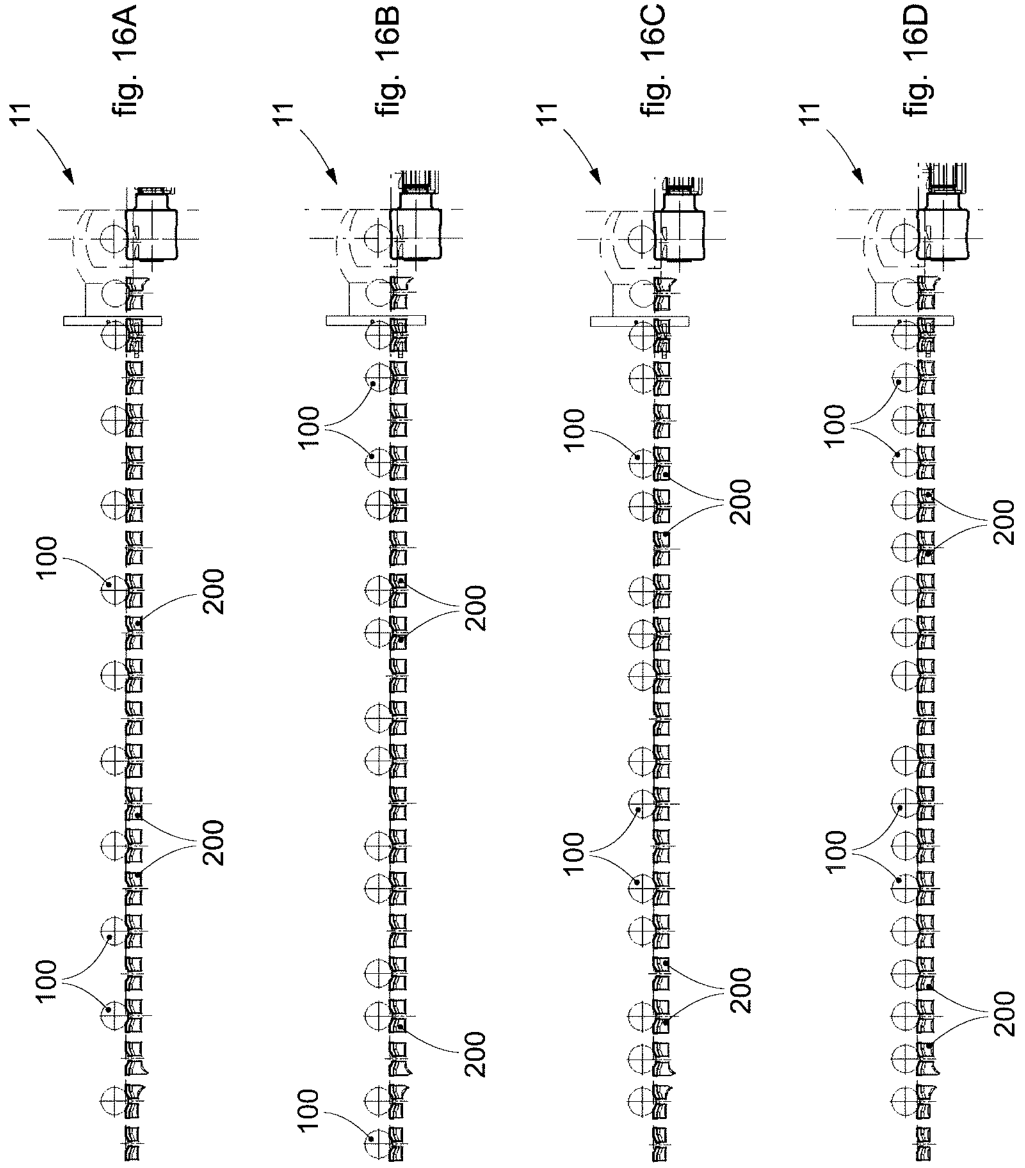
FIGS. 16A-D are schematic views of modes for feeding billets to a furnace.

FIG. 16A shows a loading class at 50%, in which only half of the seatings 200 are loaded with a semi-finished product 100. In this case, it is provided to alternate a loaded seating 200 with an empty seating 200.

A loading class at 66% can also be provided, shown in FIG. 16B, in which two loaded seatings 200 are alternated with one empty seating 200. This pattern is repeated along the advance of the seatings 200.

Yet another loading class, shown in FIG. 16C, provides a loading at 70%. This loading class can be achieved by alternating, on a cycle of ten seatings 200, two loaded seatings 200, one empty seating 200, two loaded seatings 200, one empty seating 200, three loaded seatings 200 and finally one empty seating 200. In other words, two seatings 200 out of three, two seatings 200 out of three and three seatings 200 out of four are loaded, completing a cycle of ten seatings 200.

FIG. 16D shows a fourth loading class, which provides to load 90% of the seatings 200. The loading pattern provides to load nine consecutive seatings 200 and leave one empty.

In accordance with other embodiments, it can also be provided to consider programmed rolling pauses. These pauses in the rolling can be managed in such a way as not to lengthen the permanence time in the furnace of the semi-finished products 100, for example by anticipating the interruption of the loading, knowing the expected idle time.

The idle time defines, as a function of the work rate of the load that will be processed at the end of the programmed rolling pause, the number of seatings 200 to be left empty so that the functioning of the furnace 11 is kept constant even during the entire duration of the pause.

However, we wish to point out that these voids created upon loading will result in as many voids upon discharge, and therefore there will be no semi-finished products 100 ready to be rolled. This allows to carry out the necessary work for changing the cylinders in the rolling mill, without the residence time of the semi-finished products 100 in the furnace being changed.

The number of seatings 200 to be left empty can be summarized with the following formula: (n° of empty seatings)=(idle time)/(Pacing of the charge to be loaded into the furnace at the end of the pause). The idle time and charge pacing at the end of the pause are information that has to be known for the correct management of the furnace 10.

It is clear that modifications and/or additions of parts or steps may be made to the method and to the apparatus 10 as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. An apparatus (10) for heating steel products (100), comprising a furnace of the direct combustion irradiation type, comprising inside it a path for feeding the steel products (100) which extends between an entry end (110) and an exit end (111) of the steel products (100), an entry aperture in correspondence with said entry end (110) to allow the entry of said steel products (100) into said furnace (11) and an exit aperture (150) in correspondence with said exit end (111) to allow the exit of said steel products (110) from said furnace (11), means for feeding a fuel, means for feeding a comburent comprising oxygen, and burners (40, 41) able to operate the combustion of the fuel and of the comburent, wherein said means for feeding comburent and said means for feeding fuel are configured to feed the comburent and the fuel so that oxygen is in a sub-stoichiometric or stoichiometric proportion with respect to the fuel at least in one part of said apparatus (10), wherein said exit aperture (150) is provided with a first sealing device (152) comprising a packing (153) configured to cooperate with a closing door (151) of said exit aperture (150) and first inert gas barrier means (155) configured to prevent the entry of air into said furnace (11), wherein the apparatus comprises an unloading station (12) disposed outside said furnace (11) in correspondence with said exit end (111) wherein said unloading station (12) comprises one or more conveyor devices (130) partly inserted inside said furnace (11) in order to convey said steel products (100) through said exit aperture (150), wherein said one or more conveyor devices (130) are each provided with a respective second sealing device (134), comprising water sealing means (136) and second inert gas barrier means (138, 139), and located in correspondence with a through aperture of an end wall (113) of said furnace (11).

2. The apparatus (10) as in claim 1, wherein said first inert gas barrier means (155) comprise at least one chamber (155) delimited in the edge of said exit aperture (150), wherein it comprises at least one aperture for feeding said inert gas toward said exit aperture (150).

3. The apparatus (10) as in claim 1, wherein said first sealing device (152) also comprises water sealing means (154) disposed around said exit aperture (150).

4. The apparatus (10) as in claim 1, wherein said water sealing means (136) are inserted inside said through aperture and are configured to close it hermetically, wherein said second inert gas barrier means (138, 139) are disposed immediately outside said through aperture and are coaxial to said water sealing means (136).

5. The apparatus (10) as in claim 1, wherein said unloading station (12) comprises one or more transfer devices (140) for transferring said steel products (100) from said feed path to said conveyor devices (130), wherein said transfer devices (140) each comprise at least one transfer member (141) located mobile inside a containing box (142) and partly inserted inside said furnace (11), said containing box (142) being directly connected to said furnace (11) and filled with liquid water and an inert gas in order to prevent the entry of air inside said furnace (11) and being in air communication with the inside of said furnace (11) in order to allow said transfer member (141) to enter in said furnace (11).

6. The apparatus (10) as in claim 1, wherein said furnace (11) comprises an upper wall (116) formed by a plurality of modules (116*a*) connected to each other by means of plates (161) connected to each of two consecutive modules (116*a*) by means of tie-rods (160), wherein it comprises an internal closing member (162) in each hollow space present between two consecutive modules (116*a*) so as to hermetically close the hollow spaces.

7. The apparatus (10) as in claim 6, wherein said upper wall (116) also comprises a plurality of tape-shaped packings (164) each interposed between an internal closing member (162) and one or more corresponding plates (161).

8. The apparatus (10) as in claim 1, wherein said furnace (11) comprises a lower wall (117) through which hoppers (170) are inserted, each provided with a lower duct (171), at the end of which a plate (173) is connected, wherein each hopper (170) comprises a respective sealing element (174) comprising a packing (175) and a closing element (176) attached to the external surface of said lower duct (171) and covering said packing (175).

9. The apparatus (10) as in claim 1, wherein it comprises a furnace divided internally into a first part (20) and a second part (30) disposed in succession along the path for feeding the steel products (100), wherein the temperature (T2) in the second part (30) is higher than the temperature (T1) in the first part (20), wherein the means for feeding comburent and the means for feeding fuel are configured to feed the comburent and the fuel so that oxygen is in a sub-stoichiometric or stoichiometric proportion with respect to the fuel in correspondence with said second part (30).

10. The apparatus (10) as in claim 9, wherein the first part (20) comprises an entry zone (21), which extends from the entry end (11), and a pre-heating zone (22) which extends from the end of said entry zone (21) and the beginning of the second part (30), wherein the second part (30) comprises a heating zone (31), consecutive to said pre-heating zone (22), and an equalization zone (32) which extends between said heating zone (31) and the exit end (12).

11. The apparatus (10) as in claim 1, wherein said comburent is air and the oxygen in said comburent is in a proportion equal to 2-3%, or is in a greater proportion, obtained by means of oxygen ($O_2$) enrichment techniques.

12. An apparatus (10) for heating steel products (100), comprising a furnace of the direct combustion irradiation type, comprising inside it a path for feeding the steel products (100) which extends between an entry end (110) and an exit end (111) of the steel products (100), an entry aperture in correspondence with said entry end (110) to allow the entry of said steel products (100) into said furnace (11) and an exit aperture (150) in correspondence with said exit end (111) to allow the exit of said steel products (110) from said furnace (11), means for feeding a fuel, means for feeding a comburent comprising oxygen, and burners (40, 41) able to operate the combustion of the fuel and of the comburent, wherein said means for feeding comburent and said means for feeding fuel are configured to feed the comburent and the fuel so that oxygen is in a sub-stoichiometric or stoichiometric proportion with respect to the fuel at least in one part of said apparatus (10), wherein said exit aperture (150) is provided with a first sealing device (152) comprising a packing (153) configured to cooperate with a closing door (151) of said exit aperture (150) and first inert gas barrier means (155) configured to prevent the entry of air into said furnace (11), wherein said furnace (11) comprises a lower wall (117) through which hoppers (170) are inserted, each provided with a lower duct (171), at the end of which a plate (173) is connected, wherein each hopper (170) comprises a respective sealing element (174) comprising a packing (175) and a closing element (176) attached to the external surface of said lower duct (171) and covering said packing (175), wherein each of said hoppers (170) also comprises an internal member (177) attached to the external surface of said lower duct (171) inside said closing element (176) and configured to press said packing (175) against said closing element (176).

13. An apparatus (10) for heating steel products (100), comprising a furnace of the direct combustion irradiation type, comprising inside the furnace a path for feeding the steel products (100) which extends between an entry end (110) and an exit end (111) of the steel products (100), an entry aperture in correspondence with said entry end (110) to allow the entry of said steel products (100) into said furnace (11) and an exit aperture (150) in correspondence with said exit end (111) to allow the exit of said steel products (110) from said furnace (11), means for feeding a fuel, means for feeding a comburent comprising oxygen, and burners (40, 41) able to operate the combustion of the fuel and of the comburent, wherein said means for feeding comburent and said means for feeding fuel are configured to feed the comburent and the fuel so that oxygen is in a sub-stoichiometric or stoichiometric proportion with respect to the fuel at least in one part of said apparatus (10), wherein said exit aperture (150) is provided with a first sealing device (152) comprising a packing (153) configured to cooperate with a closing door (151) of said exit aperture (150) and first inert gas barrier means (155) configured to prevent the entry of air into said furnace (11), wherein the apparatus (10) comprises a furnace divided internally into a first part (20) and a second part (30) disposed in succession along the path for feeding the steel products (100), wherein the temperature (T2) in the second part (30) is higher than the temperature (T1) in the first part (20), wherein the means for feeding comburent and the means for feeding fuel are configured to feed the comburent and the fuel so that oxygen is in a sub-stoichiometric or stoichiometric proportion with respect to the fuel in correspondence with said second part (30), wherein the furnace comprises a post-combustion device able to promote the complete combustion in the first part (20) of the residues of fuel not burnt in the second part (30) of the furnace (10).

14. The apparatus (10) as in claim 13, wherein the post-combustion device comprises one or more nozzles (50) disposed in the first part (20) of the furnace (10) and configured to inject comburent therein.

15. The apparatus (10) as in claim 14, wherein the nozzles (50) of the post-combustion device are disposed on an upper internal edge (23) which separates the first part (20) from the second part (30), and/or on a lower internal edge which separates the first part (20) from the second part (30).

* * * * *